United States Patent [19]

Schleicher et al.

[11] Patent Number: 5,792,437
[45] Date of Patent: Aug. 11, 1998

[54] FILTER MATERIAL AND METHOD OF REMOVING OXIDES OF NITROGEN FROM GASES AND LIQUIDS

[75] Inventors: Andreas Schleicher, Beselich; Dietrich Fleischer, Darmstadt; Jurgen Kulpe, Frankfurt; Georg Frank, Tubingen, all of Germany

[73] Assignee: Hoechst Aktiengesellschaft, Germany

[21] Appl. No.: 601,015

[22] PCT Filed: Aug. 11, 1994

[86] PCT No.: PCT/EP94/02688

§ 371 Date: Jul. 15, 1996

§ 102(e) Date: Jul. 15, 1996

[87] PCT Pub. No.: WO95/05894

PCT Pub. Date: Mar. 2, 1995

[30] Foreign Application Priority Data

Aug. 24, 1993 [DE] Germany .................. 43 28 450.7

[51] Int. Cl.$^6$ .................................................. B01D 37/00
[52] U.S. Cl. ................. 423/239.1; 210/749; 210/758; 210/903
[58] Field of Search ........................ 210/903, 749, 210/758; 502/401; 423/239.1; 568/21

[56] References Cited

U.S. PATENT DOCUMENTS

| | | | |
|---|---|---|---|
| 2,374,559 | 4/1945 | Morris et al. | 252/48 |
| 3,948,865 | 4/1976 | Brady et al. | 260/79 |
| 4,059,719 | 11/1977 | Blaha et al. | 562/52 |

FOREIGN PATENT DOCUMENTS

| | | |
|---|---|---|
| 0098823 | 1/1984 | European Pat. Off. |
| 0297744 | 1/1989 | European Pat. Off. |
| 0343674 | 11/1989 | European Pat. Off. ............ 423/239.1 |
| WO 91/18041 | 11/1991 | WIPO |

OTHER PUBLICATIONS

Römpp Chemie Lexikon, 9$^{th}$ Edition, vol. 5, "Stickstoffoxide", pp. 4314–4317 (1992) no month.

Ullmann's Encyclopedia of Industrial Chemistry, Edited by Elvers et al., vol. A17 "Naphthalene to Nuclear Technology", 5th completely revised edition, pp. 327–330 (1991) no month.

Blood, Coagulants and Anticoagulants to Cardiovascular Agents, Third Edition, vol. 4, Kirk–Othmer, "Encyclopedia of Chemical Technology", p. 565 (1979) no month.

Roupp Chemie Lexikon 9$^{th}$ Edition, vol. 2, ISBN 3-13-734709-2, "Entstickung", pp. 1180–1181 (1990) no month.

Von R. Gabler and J. Studinka, "Neue Polyphenylensulfone Reaktionen an festen Polymeren", Chimia 28 (Sep. 1974) Nr. 9, pp. 567–575.

*Primary Examiner*—Gary P. Straub
*Assistant Examiner*—Timothy C. Vanoy
*Attorney, Agent, or Firm*—Connolly & Hutz

[57] ABSTRACT

A method for removing oxides of nitrogen from gases and liquids by contacting a $NO_x$ containing gas or liquid with a polyarylene thioether filter material and a solid oxidizing agent having an electron potential greater than 0.96 V, wherein the solid oxidizing agent oxidizes NO into $NO_2$ which is removed by the polyarylene thioether filter material.

5 Claims, No Drawings

FILTER MATERIAL AND METHOD OF REMOVING OXIDES OF NITROGEN FROM GASES AND LIQUIDS

This application is a national stage filing under 35 USC 371 of PCT/EP94/02688 filed 11 Aug. 1994.

The invention relates to a filter material and to a method of removing oxides of nitrogen from gases and liquids, in which the stream of gas or a liquid is brought into contact with a filter material comprising polyarylenethioether or a mixture of polyarylenethioether and oxidative compounds.

It is known that virtually all combustion processes, for example in power stations which operate using fossil fuels and in the engines of motor vehicles, are accompanied by the formation of so-called oxides of nitrogen ($NO_x$) which pass into the environment. These oxides essentially comprise nitrogen monoxide (NO) and nitrogen dioxide ($NO_2$) and/or adducts of the two. Because of the readiness of nitrogen monoxide to undergo oxidation with oxygen, it is predominantly nitrogen dioxide which is present in the atmosphere. In an environmental context, oxides of nitrogen give rise essentially to two problems. On the one hand they are seen as a precursor in the formation of ozone, and on the other hand they represent—even in low concentrations—a considerable health risk (Römpp Chemie Lexikon, 9th edition, vol. 5, 4314-6).

In order to remedy this situation a large number of processes have been developed which describe the removal of nitrogen oxides from the stream of air released from devices as described above, such as internal combustion engines. In these processes the oxides of nitrogen are either destroyed or else bound by chemical or physical means.

It is known to pass the stream of gas through a filter in which the oxides of nitrogen are catalytically decomposed and/or reduced at elevated temperatures by the addition of compounds which form free radicals (WO 92/04962). The base material of the filter is impregnated with one or more metallic compounds, metals or alloys, for example compounds of iron, chromium or nickel, a further addition to which is a compound or a metal from the group consisting of the so-called noble metals, for example palladium or platinum. These catalysts are very expensive and generally have only a limited service life, since such heterogenous catalysts are rapidly deactivated by a variety of catalyst poisons. Moreover, the supply of energy required is highly unfavorable.

Activated charcoal can also be used as an adsorbent for the removal of oxides of nitrogen (Römpp Chemie Lexikon, 9th edition, vol. 2, 1181, Table; Ullmann's Encycl. Ind. Chem., 5th edition, vol. A17, 328). However, activated charcoal filters are subject to ageing because of the reduction in their active surface caused by the adsorption of vapors or moisture; see also Kirk-Othmer, 3th edition, 4, 565 ("storage"). Activated carbon filters are used in particular for the removal of gasoline vapors, in cars for example, or of other hydrocarbon compounds; the filters adsorb these compounds from the air with a high degree of efficiency, resulting in a decrease in their additional adsorption capacity for $NO_x$ gases. In addition, only a small proportion of the filter weight is available as active fraction.

EP-A-0 405 265, furthermore, describes the permeation effect of specially prepared polyphenylene sulfide (PPS) films with respect to gases containing oxides of sulfur or of nitrogen. The effect in this case is one more or less of purely physical separation. It is mentioned that the media used for the separation of the waste gases should be inert with respect to the gases to be separated and that they must have a good permeability for this phase. In this case neither a complete filter effect with respect to oxides of sulfur or of nitrogen nor the adsorption of oxides of sulfur or of nitrogen was observed.

The object of the invention was therefore to provide a filter and a method of removing oxides of nitrogen without encountering the abovementioned disadvantages.

The invention relates to a polymer-based filter for removing oxides of nitrogen, especially nitrogen dioxide, from gases and liquids by chemical reaction between the filter material and oxides of nitrogen, said filter being effective even at ambient temperatures and comprising a polyarylenethioether of the formula

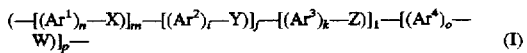
(I)

in which $Ar^1$, $Ar^2$, $Ar^3$, $Ar^4$, W, X, Y and Z independently of one another are identical or different. The indices n, m, i, j, k, l, o and p independently of one another are zero or integers 1, 2, 3 or 4, the sum of which must be at least 2; $Ar^1$, $Ar^2$, $Ar^3$ and $Ar^4$ in the formula (I) are arylene systems of 6 to 18 carbon atoms. W, X, Y and Z are divalent linking groups selected from —$SO_2$—, —S—, —SO—, —CO—, —O—, —$CO_2$— and alkylene or alkylidene groups of 1 to 6, preferably 1 to 4, carbon atoms. At least one of the linking groups W, X, Y, Z in formula (I) comprises —S—.

Preferred arylene systems are phenylene, biphenyldiyl or naphtalenediyl. W, X, Y and Z are preferably —$SO_2$—, —S— or —SO—.

The rate of reaction of nitrogen monoxide with the filter material is low. The nitrogen monoxide can be removed more effectively, however, if at least one oxidative inorganic or organic compound is added to the polymer, said compound having an electron potential of greater than or equal to 0.96 V, examples being chlorinated lime, sodium hypochlorite, vanadium pentoxide and dichlorodicyanoquinone. These compounds convert the NO into $NO_2$, which is then removed more rapidly by the polymer.

The invention relates furthermore to a method of removing oxides of nitrogen from gases and liquids, in which a filter is employed which comprises a polyarylenethioether containing recurring units of the formula (I) as the compound for decomposing oxides of nitrogen, the gas or the liquid being brought into contact with the filter material and the oxides of nitrogen being removed in a process by a chemical reaction with the filter material. For more efficient removal of nitrogen monoxide, the abovementioned oxidative inorganic or organic compounds can be added to the filter material employed in the method according to the invention.

The preferred polyarylenethioether is polyphenylene sulfide (PPS), which contains the recurring unit of the formula (II) and whose preparation process is described in, for example, U.S. Pat. Nos. 3,354,129, 3,919,177, 4,038,262 and 4,282,347.

(II)

Up to 50 mol % of the PPS of the formula (II) may also have a 1,4 and/or 1,3 linkage to the aromatic ring. The term "PPS" refers both to the linear and to the crosslinked linked material.

Examples of other starting polymers which can be used are polyarylenethioethers containing recurring units of the formulae (III)–(VII), the syntheses of which are described in, for example, Chimia 28(9), 567:

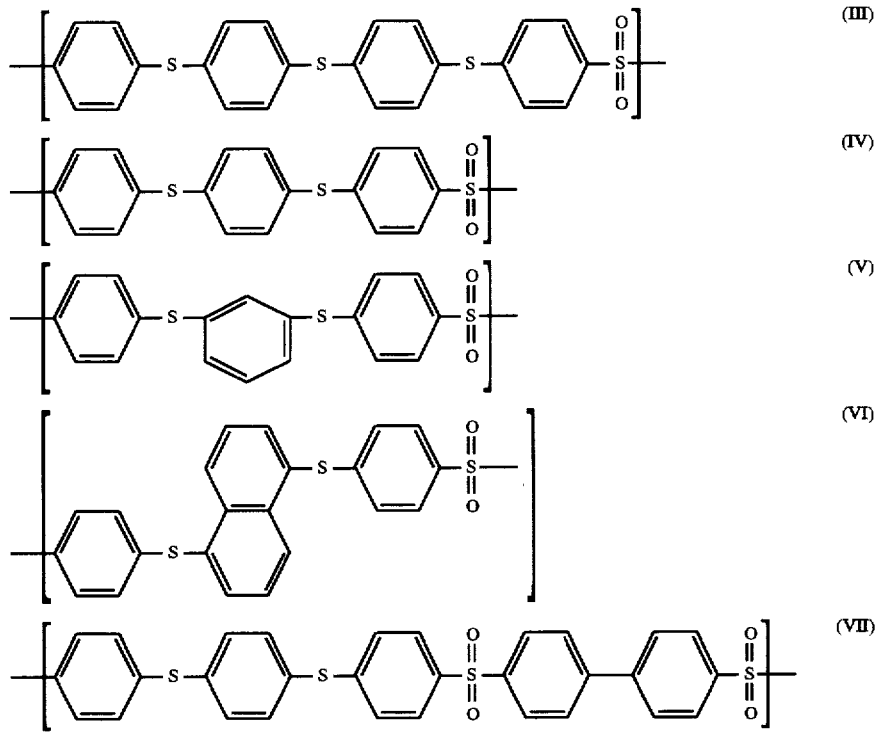

and polyarylenethioethers containing recurring units of the formula (VIII), which are described in, for example, U.S. Pat. No. 4,016,145.

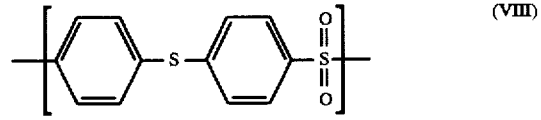

Polyarylenethioethers which are suitable for the invention generally have an average molecular weight Mw of from 4,000 to 200,000, preferably from 10,000 to 150,000, and in particular from 25,000 to 100,000, g/mol. The polymers can be employed as powders, fibers or shaped articles for the production of a filter. By means of appropriate processes, the latter can also be produced with a particularly large surface area, for example with a lattice or honeycomb structure. The powders possess the usual commercial particle sizes, in which context granules can also be used. The important factor here is that the gas or the liquid to be treated can be passed through the polymer material, for example in the form of a fixed powder bed, without interference. Where the polymers are used as fibers, they are employed in the form of staple fibers, needled felt, nonwoven material, card sliver or woven material. Films or scraps of film in appropriate form may also be used.

The stream of gas or the liquid, containing oxides of nitrogen, can be treated using the filter material according to the invention at any temperature below the softening point of the polymers. The application temperatures are generally within the range from −10° to +240° C., preferably from 0° to 220° C.

The removal of nitrogen dioxide is generally quantitative, the reaction times being dependent on the flow rates and on the surface area of the filter material or, respectively, the bed depth in the case of powders. The residence time in the filter is generally from 0.1 second to 20 minutes, preferably from 0.5 seconds to 1 minute. However, the limit values can also be exceeded.

In relation to nitrogen dioxide, the nitrogen monoxide is removed by polyarylenethioether only to a small extent. However, the addition of oxidative compounds as described above makes the removal almost quantitative, although in this case too the reaction times are dependent on the flow rates and on the surface area of the filter material or, respectively, on the bed depth in the case of powders.

In the course of the treatment of the polyarylenethioether employed with the medium containing oxides of nitrogen, the nitrogen dioxide is reduced and the thioether groups of the polymers are oxidized. The absorption capacity of the filter according to the invention extends right up to complete reaction of the sulfide bridges. The exhausted filter material, for example the oxidized polyarylene sulfide, is a newly formed polymer with properties different from those of the starting polymer. This new polymer can then be used again for other purposes, for example for the production of shaped articles. Consequently the exhausted filter materials are completely recyclable and do not constitute a burden on the environment.

The removal of the oxides of nitrogen from the stream of gas or liquid is not accompanied by the formation of any volatile products from the polymer.

The filter material based on polyarylenethioether can generally be employed as a material without additives. However, it is also possible to add conventional fillers, such as chalk, talc, clay, mica, and/or fibrous reinforcing agents, such as glass fibers, carbon fibers, whiskers, and further conventional additives and processing auxiliaries, for example lubricants, release agents, antioxidants, UV stabilizers, etc.

The filter according to the invention can be used for all $NO_x$-containing streams of gas and liquids. For example, it can be used in filter masks, air-conditioning systems, in automobiles (e.g. air filters, exhaust filters), to remove the oxides of nitrogen resulting from combustion (e.g. flue gas purification), and also to remove and to sanitize oxides of nitrogen in liquids.

A large area of application is the use of the filter materials in power stations which are operated using fossil fuels. The flue gases which are produced in this process contain a considerable proportion of $NO_x$, which has hitherto had to be reduced by a complex method in order to keep within the maximum $NO_x$ concentration of 200 mg/m$^3$ laid down in the current [German] ordinance governing large-scale heating plants. The measures previously employed in the presence of catalysts require temperatures of 350° C. or more, depending on the process used. By employing the filter material according to the invention it is possible to remove $NO_x$ at temperatures which are considerably lower; in other words, the process can be preceded by the dedusting operation which is generally necessary, after which the cooled flue gas is freed from $NO_x$. The operation of reheating the flue gases, which was required hitherto, is thus no longer necessary. Furthermore, since the method operates without a catalyst, there is no catalyst deactivation.

EXAMPLE 1

In a gas mixing system with ozone generator, apparatus type MCZ 3010 from MCZ (Roβbach, Federal Republic of Germany), so-called zero air or normal air which was dry and had been purified over activated charcoal was mixed with an NO premix in nitrogen, so that the $NO_2$ concentration of the exit gas was 0.8 ppm.

The gas mixture was passed through a filter cartridge which was filled with polyphenylene sulfide (Mw =30,000, $T_m$=288° C.) in powder form. Internal diameter: 20 mm, filling length: 50 mm, contents: 15.7 cm$^3$, flow rate: 0.5 l/min=2.65 cm$^3$/sec.

EXAMPLE 2

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 25 ppm of $NO_2$ and 50 ppm of NO in nitrogen was prepared. The starting gases were test-gas mixtures composed of 500 ppm of $NO_2$ in nitrogen and 500 ppm of NO in nitrogen, both gases having been obtained from Messer Griesheim GmbH, Wörthstr. 170, 47053 Duisburg. Dilution was with nitrogen likewise from Messer Griesheim. The flow rate of the gas mixture was 95 l/h.

The gas mixture was passed through a glass filter tube which was filled with a mixture of polyphenylene sulfide (Mw 30,000, $T_m$=288° C.) in powder form, its fraction being 0.5<x<1 mm, and Ca(OCl)$_2$ in powder form. Before insertion into the cartridge the two powders were homogeneously mixed. The internal diameter of the glass tube was 4 cm and the total filling depth was 15 cm. The contents therefore amounted to 188.4 cm$^3$. The temperature of the filter was 22° C.

The composition of the gas mixture before and after the filter was analyzed using a chemoluminescence analyzer of type CLD 700 EL ht from ECO Physics (ECO Physics AG, CH-8635 Duürnten, Switzerland). The measuring range of the instrument during the measurement was 0–100 ppm for NO, $NO_2$ and $NO_x$. During the measurement period of 5 hours the NO content was less than 2 ppm and the $NO_2$ content was less than 5 ppm. The total filter efficiency was thus greater than 90%.

EXAMPLE 3

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 25 ppm of $NO_2$ in nitrogen was prepared. The starting gas was a test-gas mixture composed of 500 ppm of $NO_2$ in nitrogen [lacuna] was obtained from Messer Griesheim GmbH, Wöbrthstr. 170, 47053 Duisburg. Dilution was with nitrogen likewise from Messer Griesheim. The flow rate of the gas mixture was 95 l/h.

The gas mixture was passed through a glass filter tube which was filled with polyphenylene sulfide (Mw=30,000, $T_m$=288° C.) in powder form, its fraction being 0.5<x<1 mm. The internal diameter of the glass tube was 4 cm and the total filling depth was 10 cm. The contents therefore amounted to 125.6 cm$^3$. The temperature of the filter was 80° C.

The composition of the gas mixture before and after the filter was analyzed using a chemoluminescence analyzer of type CLD 700 EL ht from ECO Physics (EGO Physics AG, CH-8635 Duürnten, Switzerland). The measuring range of the instrument during the measurement was 0–100 ppm for $NO_2$.

During the measurement period of 50 hours the $NO_2$ content was less than 0.2 ppm. The accuracy of the instrument is 0.2 ppm.

EXAMPLE 4

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 500 ppm of $NO_2$ in nitrogen was prepared. The starting gas was a test-gas mixture composed of 500 ppm of $NO_2$ in nitrogen [lacuna] was obtained from Messer Griesheim GmbH, Wörthstr. 170, 47053 Duisburg. Dilution was with nitrogen likewise from Messer Griesheim. The flow rate of the gas mixture was 95 l/h.

The gas mixture was passed through a glass filter tube which was filled with polyphenylene sulfide (Mw =30,000, $T_m$=288° C.) in powder form, its fraction being 0.5<x<1 mm. The internal diameter of the glass tube was 4 cm and the total filling depth was 10 cm. The contents therefore amounted to 125.6 cm$^3$. The temperature of the filter was 25° C.

The composition of the gas mixture before and after the filter was analyzed using a chemoluminescence analyser of type CLD 700 EL ht from ECO Physics (ECO Physics AG, CH-8635 Dürnten, Switzerland). The measuring range of the instrument during the measurement was 0–100 ppm for $NO_2$.

During the measurement period of 2 hours the $NO_2$ content was less than 0.2 ppm. The accuracy of the instrument is 0.2 ppm.

EXAMPLE 5

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 10 ppm of $NO_2$ in nitrogen was prepared. The starting gas was a test-gas mixture composed of 500 ppm of $NO_2$ in nitrogen [lacuna] was obtained from Messer Griesheim GmbH, Worthstr. 170, 47053 Duisburg. Dilution was with nitrogen likewise from Messer Griesheim. The flow rate of the gas mixture was 200 l/h.

The gas mixture was passed through a glass filter tube which was filled with polyphenylene sulfide (Mw=30,000, $T_m=288°$ C.) in powder form, its fraction being 0.5<x<1 mm. The internal diameter of the glass tube was 4 cm and the total filling depth was 8 cm. The contents therefore amounted to 100.5 $cm^3$. The temperature of the filter was 22° C.

The composition of the gas mixture before and after the filter was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$.

During the measurement period of 10 hours the $NO_2$ content was less than 0.2 ppm. The accuracy of the instrument is 0.2 ppm.

EXAMPLE 6

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 100 ppm of $NO_2$ in nitrogen was prepared. The starting gas was a test-gas mixture composed of 500 ppm of $NO_2$ in nitrogen [lacuna] was obtained from Messer Griesheim GmbH, Worthstr. 170, 47053 Duisburg. Dilution was with nitrogen likewise from Messer Griesheim. The flow rate of the gas mixture was 100 l/h.

The gas mixture was passed through a glass filter tube which was filled with polyphenylene sulfide (Mw=30,000, $T_m=288°$ C.) in powder form, its fraction being 0.5<x<1 mm. The internal diameter of the glass tube was 4 cm and the total filling depth was 21 cm. The contents therefore amounted to 263.8 $cm^3$. The temperature of the filter was 25° C.

The composition of the gas mixture before and after the filter was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$.

During the measurement period of 15 hours the $NO_2$ content was less than 0.2 ppm. The accuracy of the instrument is 0.2 ppm.

EXAMPLE 7

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 100 ppm of $NO_2$ in nitrogen was prepared. The starting gas was a test-gas mixture composed of 500 ppm of $NO_2$ in nitrogen [lacuna] was obtained from Messer Griesheim GmbH, Worthstr. 170, 47053 Duisburg. Dilution was with nitrogen likewise from Messer Griesheim. The flow rate of the gas mixture was 25 l/h.

The gas mixture was passed through a glass filter tube which was filled with polyphenylene sulfide (Mw=40,000, $T_m=288°$ C.) in powder form, its fraction being 0.02 mm. The internal diameter of the glass tube was 2 cm and the total filling depth was 9 cm. The contents therefore amounted to 28.3 $cm^3$. The temperature of the filter was 25° C.

The composition of the gas mixture before and after the filter was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$.

During the measurement period of 12 hours the $NO_2$ content was less than 0.2 ppm. The accuracy of the instrument is 0.2 ppm.

EXAMPLE 8

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 100 ppm of $NO_2$ in nitrogen was prepared. The starting gas was a test-gas mixture composed of 500 ppm of $NO_2$ in nitrogen [lacuna] was obtained from Messer Griesheim GmbH, Worthstr. 170, 47053 Duisburg. Dilution was with nitrogen likewise from Messer Griesheim. The flow rate of the gas mixture was 25 l/h.

The gas mixture was passed through a glass filter tube which was filled with polyphenylene sulfide (Mw=40,000, $T_m=288°$ C.) in powder form, its fraction being 0.5<x<0.8 mm. The internal diameter of the glass tube was 2 cm and the total filling depth was 13 cm. The contents therefore amounted to 40.8 $cm^3$. The temperature of the filter was 25° C.

The composition of the gas mixture before and after the filter was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$.

During the measurement period of 12 hours the $NO_2$ content was less than 0.2 ppm. The accuracy of the instrument is 0.2 ppm.

EXAMPLE 9

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 50 ppm of $NO_2$ in nitrogen was prepared. The starting gas was a test-gas mixture composed of 500 ppm of $NO_2$ in nitrogen [lacuna] was obtained from Messer Griesheim GmbH, Worthstr. 170, 47053 Duisburg. Dilution was with nitrogen likewise from Messer Griesheim. The flow rate of the gas mixture was 12 l/h.

The gas mixture was passed through a reaction vessel with paddle stirrer, in which 20 g of a polyphenylene sulfide powder (Mw=30,000, $T_m=288°$ C.) having an average particle diameter of $200 \times 10^{-6}$ m were suspended in 75 ml of dichloromethane. The gas mixture was passed through the suspension. The reaction temperature was 25° C.

The composition of the gas mixture before and after passing through the suspension was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$. During the measurement period of 30 minutes the $NO_2$ content was less than 4 ppm. The accuracy of the instrument is 0.2 ppm.

EXAMPLE 10

In a gas mixing system comprising flow controllers (MKS Instruments type 1259 C) and an associated control instrument (MKS Instruments 247 C, MKS Instruments GmbH, 81829 Munich, Schatzbogen 43, Federal Republic of Germany) a gas mixture composed of 10 ppm of $NO_2$ in nitrogen was prepared. The starting gas was a test-gas mixture composed of 500 ppm of $NO_2$ in nitrogen [lacuna] was obtained from Messer Griesheim GmbH, Wörthstr. 170, 47053 Duisburg. Dilution was with nitrogen likewise from Messer Griesheim. The flow rate of the gas mixture was 12 l/h.

The gas mixture was passed through a reaction vessel with paddle stirrer, in which 20 g of a polyphenylene sulfide powder (Mw=30,000, $T_m$=288° C.) having an average particle diameter of $200 \times 10^{-6}$ m were suspended in 75 ml of dichloromethane. The gas mixture was passed through the suspension. The reaction temperature was 25° C.

The composition of the gas mixture before and after passing through the suspension was analyzed using a chemoluminescence analyzer of type CLD 700 EL ht from ECO Physics (ECO Physics AG, CH-8635 Dürnten, Switzerland). The measuring range of the instrument during the measurement was 0–100 ppm for $NO_2$. During the measurement period of 30 minutes the $NO_2$ content was less than 1 ppm. The accuracy of the instrument is 0.2 ppm.

The gas flow was passed into an $NO/NO_2$ analyzer, Tecan Model CLD700 from Zellweger Tecan Systeme (Munich, Federal Republic of Germany), measurement range 0–10 ppm, and the gas mixture which had been passed through the filter cartridge was analyzed for a period of more than 48 hours. Over this period the $NO_x$ fraction of the gas mixture was completely absorbed; the values measured by the analyzer are in the region of the detection limit.

We claim:

1. A method of removing oxides of nitrogen from gases and liquids which comprises employing a filter which contains (a) a polyarylenethioether with recurring units of the formula

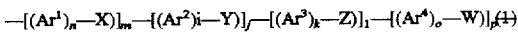

in which $Ar^1$, $Ar^2$, $Ar^3$, $Ar^4$, W, X, Y and Z independently of one another are identical or different, the indices n, m, i, j, k, l, o and p independently of one another are zero or integers, 1, 2, 3 or 4, the sum of which is at least 2, $Ar^1$, $Ar^2$, $Ar^3$ and $Ar^4$ are arylene systems of 6 to 18 carbon atoms and W, X, Y and Z are divalent linking groups selected from —$SO_2$—, —S—, —SO—, —CO—, —O—, —$CO_2$— or alkylene or alkylidene groups of 1 to 6 carbon atoms, and at least of the linking groups W, X, Y, Z comprises —S— and (b) at least one solid oxidizing agent having an electron potential of greater than or equal to 0.96 V, which converts NO into $NO_2$ with the $NO_2$ then being removed by the filter, the gas or the liquid being brought into contact with the filter material and the oxides of nitrogen being removed quantitatively in the process by a chemical reaction with the filter material.

2. The method as claimed in claim 1 wherein the removal of the oxides of nitrogen is carried out at temperatures of from minus 10° to +240° C.

3. The method as claimed in claim 1, wherein the residence time of the gases containing oxides of nitrogen in the filter material is from 0.1 second to 20 minutes.

4. The method as claimed in claim 1, the filter material being in the form of powder, fibers, films or shaped articles.

5. The method as claimed in claim 1, wherein the average molecular weight Mw of the polyarylenethioether is from 4,000 to 200,000 g/mol.

* * * * *